United States Patent [19]
Claflin

[11] 3,920,094
[45] Nov. 18, 1975

[54] LANDING GEAR FOOT

[75] Inventor: Hyle K. Claflin, Kent, Mich.

[73] Assignee: Westran Corporation, Muskegon, Mich.

[22] Filed: Jan. 28, 1974

[21] Appl. No.: 437,507

[52] U.S. Cl. .......... 280/150.5; 248/188.8; 254/86 H
[51] Int. Cl.² ............................................. B60S 9/02
[58] Field of Search ...................... 248/188.8, 188.9; 280/150.5; 254/86 H; 16/42 R, 42 T; 5/104–109

[56] References Cited
UNITED STATES PATENTS

| | | | |
|---|---|---|---|
| 1,958,114 | 5/1934 | Robinson | 280/150.5 |
| 2,526,905 | 10/1950 | Sartin | 280/150.5 |
| 3,666,290 | 5/1972 | Dalton et al. | 248/188.9 X |
| 3,716,252 | 2/1973 | Johnson | 280/150.5 |
| 3,781,035 | 12/1973 | Petersson et al. | 254/86 H |
| 3,801,068 | 4/1974 | Kopas | 280/150.5 |

FOREIGN PATENTS OR APPLICATIONS 1,114,132   4/1956   France ............................ 280/150.5

*Primary Examiner*—Roy D. Frazier
*Assistant Examiner*—Robert W. Gibson, Jr.
*Attorney, Agent, or Firm*—Gifford, Chandler & Sheridan

[57] ABSTRACT

A landing gear foot pivotally mounted at the lower end of a vehicle landing gear leg. The landing gear foot comprises a body having a curved outer surface, two spaced apart bearing journals having aligned axes, and two gusset plates, each connecting a different one of the bearing journals to the curved body. An aperture is formed through the curved body between the gusset plates. The landing gear foot is pivotally connected to the landing gear leg proximate the free end thereof by means of the bearing journals and appropriate shafts.

9 Claims, 5 Drawing Figures

LANDING GEAR FOOT

BACKGROUND OF THE INVENTION

I. Field of the Invention

The present invention generally relates to landing gear for trailers, and more particularly to a new construction for the feet for such landing gear.

II. Description of the Prior Art

The purpose of landing gear for trailers is to support the end of the trailer opposite the trailer road wheels when the trailer is disconnected from the towing tractor. These landing gear are not constructed to support the trailer while it is moving.

However, when a trailer is being loaded and unloaded, it is sometimes caused to move, particularly in a back and forth direction generally along the longitudinal length of the trailer. This movement is usually caused by the equipment used to load and unload the trailer, such as fork lift trucks. Furthermore, the usual method for hitching a towing tractor to the trailer is to back the tractor under the end of the trailer having the trailer hitch. This procedure also applies a force to the trailer, again generally along its longitudinal axis, which tends to jar and move the trailer.

Heretofore known landing gear for trailers have included a pair of landing gear legs, each connected at one end to the trailer, and having a wheel rotatably mounted to its other end. Another form of heretofore known landing gear foot was a plate having a flat surface in place of the rotatably mounted wheel for contact with the ground.

The purpose for the rotatably mounted wheels on the ends of the landing gear legs is to allow the trailer to move, or to rock, in the direction of its length to prevent the forces causing this movement to be transmitted to the landing gear leg and to thereby damage it.

One primary drawback of the rotary mounted wheel is its cost. Also if movement of the trailer is to be limited it is necessary to block the wheels. The disadvantage of the landing gear foot comprising a flat plate is, of course, that it allows the forces causing the back and forth motion of the trailer to be transmitted to the landing gear leg.

SUMMARY OF THE INVENTION

The landing gear foot of the present invention obviates the drawbacks of the heretofore known landing gear feet. The landing gear foot of the present invention comprises a body having a curved outer surface, which outer surface contacts the ground, and pivotal mounting means for pivotally connecting the body to the vehicle landing gear. The body is sufficiently long to provide greater ground area contact than wheels.

When the trailer is resting upon the landing gear leg, and is caused to move, or rock back and forth, in a direction of its longitudinal axis, the curved outer surface of the body allows the body of the landing gear foot to pivot about its pivotal mounting to the landing gear leg, thus allowing the trailer to freely rock back and forth preventing the force causing the motion from being transmitted to the landing gear leg and damaging it. Rotation of the body member, however, is limited so that the trailer cannot move any appreciable distance.

DESCRIPTION OF THE DRAWINGS

The preferred embodiment of the present invention is illustrated in the accompanying drawings, where like numerals refer to like parts throughout the several views and in which.

DETAILED DESCRIPTION OF THE PREFERRED EMBODIMENT

Figure 1:
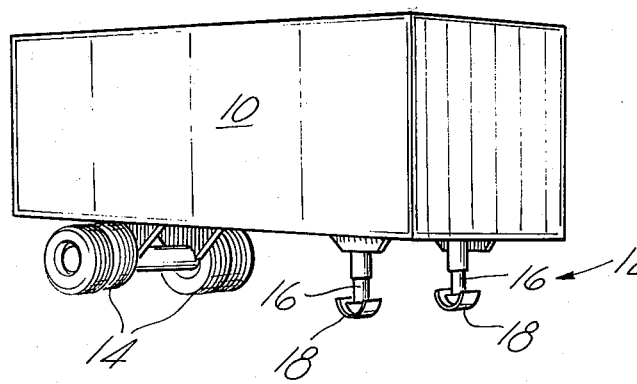
FIG. 1 is a perspective view of a trailer equipped with landing gears having landing gear feet of the present invention.
Figure 2:
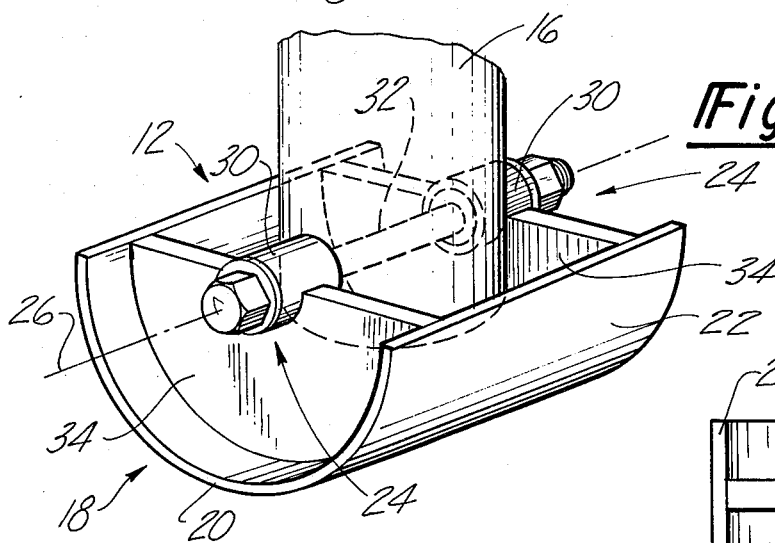
FIG. 2 is a perspective view of the landing gear foot shown in FIG. 1.
Figure 3:
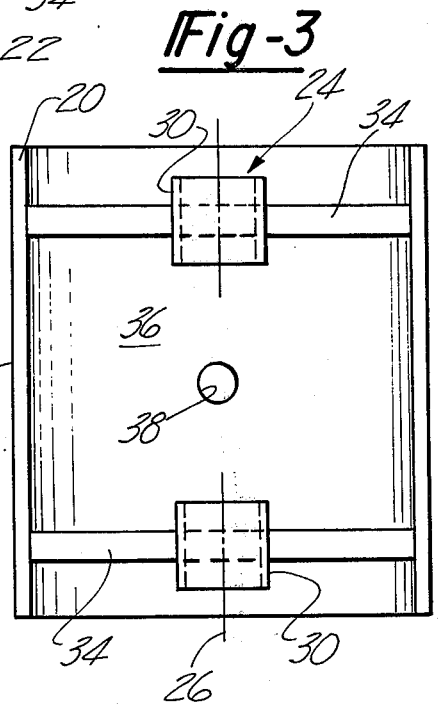
FIG. 3 is a top view of the landing gear foot of FIG. 1.
Figure 4:
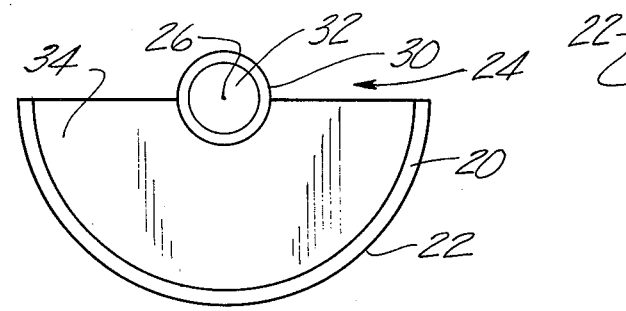
FIG. 4 is a side view of the landing gear foot of FIG. 1.
Figure 5:
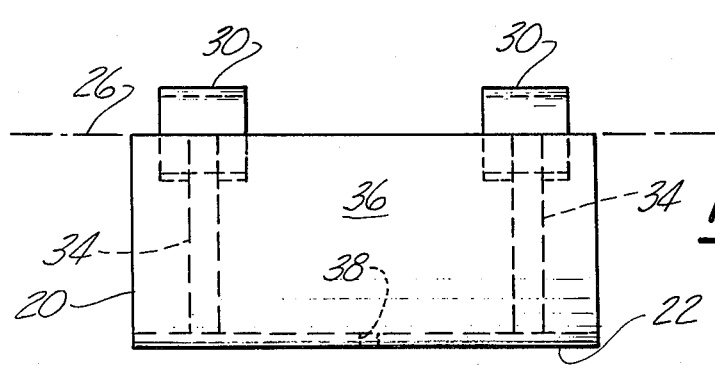
FIG. 5 is a front view of the landing gear foot of FIG. 1.

Referring to FIG. 1, a conventional trailer 10 includes a pair of landing gears 12 mounted toward the end thereof opposite the end to which the trailer road wheels 14 are mounted. The landing gears 12 support the trailer 10 when it is uncoupled from a towing tractor.

Each of the landing gear 12 includes a leg 16, which may be of any desired cross sectional shape, but is shown as a tubular construction for exemplary purposes, and a landing gear foot 18. The landing gear leg 16 may be of virtually any type such as the fixed, pivotal or retractable section. As shown in FIG. 1, the leg 16 is usually substantially vertically disposed while supporting the trailer 10.

Referring particularly to FIGS. 2–5, the landing gear foot 18 of the present invention comprises a body 20 having a curved shaped outer surface 22 and a pivotal mounting means generally denoted as 24, for pivotally connecting the body 20 to the landing gear leg 16. Preferably, the pivotal axis 26 of the pivotal mounting means 24 is coincident with the center of curvature of the curved shaped outer surface 22 of the body 20. In addition, the pivotal axis 26 of the pivotal mounting means 24 is generally perpendicular to the longitudinal axis of the landing gear leg 16.

A trailer is usually unloaded from an end which is transverse to the longitudinal axis of the trailer. Therefore, the pivotal axis 26 of the pivotal mounting means 24 will usually be oriented generally perpendicular to the longituidnal axis of the trailer.

The curved outer surface 22 of the landing gear foot body 20 is shown as being substantially a semi-circle. However, the outer surface 22 may follow an irregular curve, regular curve or arcuate curve as well.

With continued reference to FIGS. 2–5, the pivotal mounting means 24 comprises at least two spaced apart bearing journals 30. The pivotal axes of the bearing journals 30 are coincident, thereby forming the pivotal axis 26. The space between the bearing journals 30 is adequate to receive therebetween the lower, or free end of the landing gear leg 16.

The bearing journals 30 are pivotally associated with the leg 16 by means of, for example, a shaft 32 received through each of the bearing journals 30 and through appropriate apertures in the landing gear leg. Alternately, the shaft 32 could consist of oppositely extending trunnions projecting from the landing gear leg 16 and received in respective bearing journals 30.

The bearing journals 30 are structurally associated with the body 20 by means of two spaced apart gusset plates 34, each of the gusset plates being associated with a different one of the bearing journals 30.

It should be noted that in the embodiment shown in the figures, the body 20 and gussets 34 cooperate to define a hollow cavity 36. To prevent the accumulation of water in the cavity 36, an aperture 38 is formed in the body 20 to allow for the drainage of water from the cavity 38.

The landing gear foot 18 may be constructed of virtually any strong material. However, it is contemplated that it be fabricated of tubular steel cut in half longitudinally with the gusset plates 34 welded in place. This provides a relatively inexpensive construction but one which will withstand the forces that it will be subjected to in use.

It should also be noted that the landing gear foot 18 is prevented from rotating completely about its pivotal axis 26 due to the fact that the body 20 will interfere with the leg 16 after the body 20 has rotated through an angle less than 90°. The angle through which the body 20 will rotate before coming in contact with the leg 16 is a function of the curvature of radius of the curved surface 22, the thickness of material used for the body 20, and the distance between the axis of rotation 26 and the outermost surface of the leg 16.

It is apparent that a landing gear foot has been described which is substantially more economical to produce than conventional wheel constructions. Further, it provides greater ground area contact to thereby increase stability. The body members cannot rotate completely so that added safety is provided by this limitation on the distance a trailer can roll when standing alone.

The foregoing detailed description is given primarily for clarity of understanding and no unnecessary limitations should be understood therefrom for modifications will be obvious to those skilled in the art upon reading the disclosure and may be made without departing from the spirit of the invention or the scope of the appended claims:

I claim:

1. A landing gear foot for a vehicle landing gear having a landing gear leg, comprising:
    a body having a substantially semi-circular curved shaped outer surface for contact with the ground; and
    pivotal mounting means for pivotally connecting said body to the leg of the vehicle landing gear the pivotal axis being coincident with the center of curvature of said outer surface; and in which said body of said landing gear foot has an open top, said landing gear leg extending into said open top to engage with the sides of said landing gear foot upon pivotal movement thereof to limit pivoting of said foot to less than 90°.

2. A landing gear foot as defined in claim 1, wherein the pivotal axis of said pivotal mounting means is generally perpendicular to the longitudinal axis of the vehicle landing leg.

3. A landing gear foot as defined in claim 1, wherein said curved outer surface is an arcuate surface.

4. A landing gear foot as defined in claim 1, wherein said pivot mounting means comprises at least one journal bearing.

5. A landing gear foot as defined in claim 4, further comprising at least one gusset plate connecting said journal bearing to said body.

6. A landing gear foot as defined in claim 1, wherein said pivot mounting means comprises:
    two spaced apart journal bearings having their respective pivotal axis aligned.

7. A landing gear foot as defined in claim 6, further comprising:
    a first gusset plate connecting said body to one of said journal bearings;
    a second gusset plate spaced from said first gusset plate connecting said body to the other of said journal bearings.

8. A landing gear foot as defined in claim 7, further comprising an aperture formed through said body between said spaced apart gusset plates.

9. A landing gear foot as defined in claim 1 and in which said body is formed from a tubular member, said tubular member being cut substantially in half longitudinally.

* * * * *